United States Patent
Tsai et al.

(10) Patent No.: US 8,569,389 B2
(45) Date of Patent: Oct. 29, 2013

(54) ORGANIC/INORGANIC HYBRID COMPOSITE PROTON EXCHANGE MEMBRANE

(75) Inventors: Li-Duan Tsai, Hsinchu (TW); Yong-Hong Liao, Taichung County (TW); Shih-Wen Chen, Tainan County (TW); Jiunn-Nan Lin, Taoyuan County (TW); Chien-Ming Lai, Yilan County (TW); Chiu-Ping Huang, Hsinchu (TW); Sung-Chun Chang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 274 days.

(21) Appl. No.: 12/981,464

(22) Filed: Dec. 29, 2010

(65) Prior Publication Data

US 2011/0160319 A1 Jun. 30, 2011

(30) Foreign Application Priority Data

Dec. 31, 2009 (TW) ................................ 98146211 A

(51) Int. Cl.
C08J 5/22 (2006.01)
B82Y 30/00 (2011.01)

(52) U.S. Cl.
USPC ............................................. 521/27; 977/734

(58) Field of Classification Search
USPC ............................................. 521/27; 977/734
See application file for complete search history.

(56) References Cited

U.S. PATENT DOCUMENTS

| | | | |
|---|---|---|---|
| 6,117,581 A | 9/2000 | Shelef | |
| 7,198,863 B2 | 4/2007 | Nuber et al. | |
| 8,227,117 B2 * | 7/2012 | Hampden-Smith et al. | .. 429/400 |
| 2003/0022055 A1 | 1/2003 | Menashi | |
| 2004/0224203 A1 | 11/2004 | Bhamidipati et al. | |
| 2005/0221141 A1 | 10/2005 | Hampden-Smith et al. | |
| 2005/0233183 A1 * | 10/2005 | Hampden-Smith et al. | .... 429/12 |
| 2006/0073370 A1 | 4/2006 | Krusic et al. | |
| 2006/0182942 A1 | 8/2006 | Valle et al. | |
| 2009/0098442 A1 | 4/2009 | Pak et al. | |
| 2009/0208780 A1 * | 8/2009 | Sun et al. | ......................... 429/12 |

FOREIGN PATENT DOCUMENTS

| | | | |
|---|---|---|---|
| CN | 1905255 | | 1/2007 |
| CN | 101157763 | | 4/2008 |
| CN | 101157763 A | * | 4/2008 |
| CN | 101414686 | | 4/2009 |
| CN | 101414686 A | * | 4/2009 |
| JP | 2006-216285 | | 8/2006 |
| JP | 2007-535787 | | 12/2007 |
| JP | 2008-066221 | | 3/2008 |

OTHER PUBLICATIONS

"First Office Action of China counterpart application" issued on Jul. 31, 2012, p. 1-p. 6, in which the listed references were cited.

(Continued)

*Primary Examiner* — Michael Bernshteyn
(74) *Attorney, Agent, or Firm* — Jianq Chyun IP Office

(57) ABSTRACT

An organic/inorganic hybrid composite proton exchange membrane is provided. The proton exchange membrane includes an inorganic material of about 0.5-30 parts by weight and an organic material of about 99.5-70 parts by weight per 100 parts by weight of the proton exchange membrane. A surface area of the inorganic material is about 50-3000 m²/g. The organic material includes a sulfonated polymer or a phosphoric acid doped polymer.

3 Claims, 4 Drawing Sheets

(56) References Cited

OTHER PUBLICATIONS

"Office Action of Japan Counterpart Application", issued on Dec. 18, 2012, p. 1-p. 3, in which the listed reference was cited.

"Office Action of Japan counterpart application" issued on May 14, 2013, p. 1-p. 4, in which the listed reference was cited.

* cited by examiner

ORGANIC/INORGANIC HYBRID COMPOSITE PROTON EXCHANGE MEMBRANE

CROSS-REFERENCE TO RELATED APPLICATION

This application claims the priority benefit of Taiwan application serial no. 98146211, filed on Dec. 31, 2009. The entirety of the above-mentioned patent application is hereby incorporated by reference herein and made a part of this specification.

BACKGROUND OF THE INVENTION

1. Field of the Invention

The present invention relates to the field of ion exchange composite membranes. The present invention particularly describes organic/inorganic hybrid composite proton exchange membranes which can be operated in a high temperature, low humidity environment.

2. Description of Related Art

Fuel cells (FC) are electrochemical devices that convert chemical energy directly into electrical energy. FC have been used as a power source in many applications and can provide improved efficiency, reliability, durability, cost and environmental benefits over other source of electrical energy. As a result of the improved operation of these FC over other sources of energy, and in particular, the reduced emissions (i.e., practically zero harmful emissions). The FC are applicable to various fields, such as a portable electronic product, a home power generation system, transportation, military equipment, space industry, a small-size power generation system, and so forth.

Specifically, various FCs can be applied to different fields based on different operational conditions. When the FC is used as a mobile energy source, the FC mainly refers to a hydrogen proton exchange membrane fuel cell (PEMFC) and a direct methanol fuel cell (DMFC). Both of them are operated at low temperature with use of the proton exchange membrane to perform proton conduction mechanism.

Generally, the fuel cell comprises an anode, at which electron are catalytically removed from the fuel and fed to an external circuit, and proton are catalytically removed from the fuel and fed across a proton exchange membrane to a cathode, where the electrons, protons, and an oxidant are recombined to close the circuit. Taken PEMFC for example, hydrogen oxidation reaction takes place in an anode catalyst layer, such that hydrogen ions ($H^+$) and electrons ($e^-$) are generated. The hydrogen ions can be conducted to the cathode through a proton-conducting membrane, while the electrons can be transported to the cathode after the electrons flowing through an external circuit are applied to a load to work. Here, reduction reaction between the oxygen supplied to the cathode and the hydrogen ions and the electrons occurs at a cathode catalyst layer, and thereby water is produced. So the performance of the PEMFC relies on three-phase catalytic reaction efficiency, i.e. electron-conductivity, ion-conductivity, and fuel-activity that all matter to design of the FC. As long as any path of the three is hindered, the performance of the PEMFC is affected accordingly. Here, the ion-conductivity is mainly determined based on the proton exchange membrane.

Prior fuel cell systems typically utilize an externally humidified air stream to maintain the proper moisture level of the membranes of the MEA. However, providing water to the stack is costly from a system point of view, and it is desirable to supply as little water as possible in order to minimize system complexity and cost. Based on the above, the PEMFC tends to be equipped with a low humidification operating system. By contrast, passive operation of the DMFC is gradually developed. The key technology of the PEMFC and the DMFC lies in high water-retention capacity and the proton exchange membrane capable of conducting protons rapidly.

In the low humidification PEMFC, adsorbent materials embedded in the membrane which adsorb water under wet conditions and provide a reservoir of water to keep the membrane irrigated under dry conditions. Thus, the water adsorbing materials allow the fuel cell to survive periods of "inletstream draught" without excessive loss in conductivity. On the contrary, methanol with high concentration acts as fuel in the passive DMFC that is characterized by reduced system components and easy-to-carry methanol with high energy density. Besides, the methanol stays in the liquid state on all conditions and does not require a complex vaporization process and relative components for generating hydrogen gas in a direct FC.

Nevertheless, on the one hand the passive DMFC uses highly concentrated methanol vapor as fuel and on the other DMFC requires water as another anode fuel, so that insufficient water brings about an increase in ion conduction resistance. Thereby, performance of the passive DMFC is significantly deteriorated. On the other hand, since fuel with extremely low relative humidity is supplied to the PEMFC with the low humidification, there are issues of proton conduction resistance and peeling of the catalyst layer caused by ion exchange membrane shrinkage on a wet-dry operational condition. Hence, how to maintain the water-retention capacity, dimensional stability, electrochemical stability, chemical resistance, flexibility, and mechanical strength during the high temperature operation is the issue to be resolved no matter the passive DMFC using the highly concentrated methanol vapor or the hydrogen PEMFC with the low humidification operating system is employed. As such, it is a pressing need to develop a proton exchange membrane which is capable of conducting protons rapidly and characterized by high water-retention capacity and favorable dimensional stability.

SUMMARY OF THE INVENTION

The present invention is generally directed to an organic/inorganic hybrid composite proton exchange membrane. The proton exchange membrane has favorable water-retention capacity, mechanical strength, and conductivity, and swelling or distortion of the proton exchange membrane in high temperature water is rather unlikely to happen.

In the present invention, an organic/inorganic hybrid composite proton exchange membrane is provided. The proton exchange membrane includes an inorganic material of about 0.5-30 parts by weight and an organic material of about 99.5-70 parts by weight per 100 parts by weight of the proton exchange membrane. A surface area of the inorganic material is about 50-3000 $m^2/g$. The organic material includes a sulfonated polymer or a phosphoric acid doped polymer.

The proton exchange membrane described in the embodiments of the invention has favorable water-retention capacity, satisfactory mechanical strength, and great conductivity. Besides, swelling or distortion of the proton exchange membrane in high temperature water is rather unlikely to happen.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the ideas of the invention.

DESCRIPTION OF EMBODIMENTS

Figure 1:
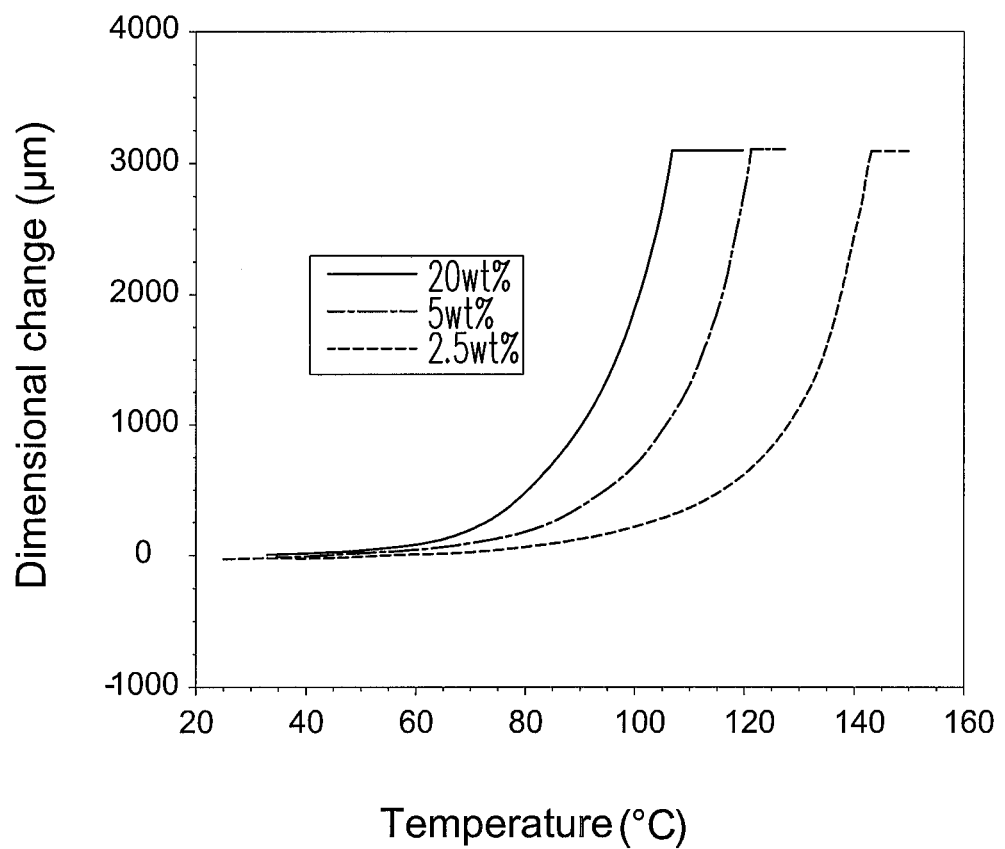
FIG. 1 shows changes of glass transition temperature (Tg points) of proton exchange membranes containing various contents of activate carbon.

In the invention, organic/inorganic hybrid composite proton exchange membranes are provided. The proton exchange membrane having an organic material and an inorganic material is characterized by high water-retention capacity and can rapidly conduct protons, such that the proton exchange membrane can be applied to a PEMFC with a low humidification operating system during the high temperature operation or a passive DMFC to which methanol vapor with high concentration is supplied.

According to an embodiment, the proton exchange membrane includes the inorganic material of 2.5 parts by weight and the organic material of 97.5 parts by weight per 100 parts by weight of the proton exchange membrane. According to another embodiment, the proton exchange membrane includes the inorganic material of 5 parts by weight and the organic material of 95 parts by weight per 100 parts by weight of the proton exchange membrane. According to still another embodiment, the proton exchange membrane includes the inorganic material of 10 parts by weight and the organic material of 90 parts by weight per 100 parts by weight of the proton exchange membrane. According to still another embodiment, the proton exchange membrane includes the inorganic material of 20 parts by weight and the organic material of 80 parts by weight per 100 parts by weight of the proton exchange membrane.

The organic material of the aforesaid proton exchange membrane includes a sulfonated polymer or a phosphoric acid doped polymer. The sulfonated polymer includes Nafion, sulfonated poly(ether ether ketone) (s-PEEK), sulfonated polyimides (s-PI), sulfonated poly(phenylene oxide) (s-PPO), sulfonated poly(arylene ether sulfone) (s-PES), or sulfonated poly(4-phenoxybenzoyl-1,4-phenylene) (s-PPBP). The phosphoric acid doped polymer includes phosphoric acid doped polybenzimidazole (PBI).

The inorganic material of the aforesaid proton exchange membrane includes a water-absorbing material with a large surface area. The surface area of the water-absorbing material is about 50 $m^2/g$ or more. According to an embodiment, the surface area of the water-absorbing material is about 2100 $m^2/g$. According to another embodiment, the surface area of the water-absorbing material is about 800 $m^2/g$. According to still another embodiment, the surface area of the water-absorbing material is about 210 $m^2/g$. The water-absorbing material includes a carbon material. According to an embodiment, the carbon material is an unmodified carbon material including activate carbon, a mesoporous carbon material, a carbon nano-shell layer, carbon nano horn, carbon nano sheet, amorphous carbon, or crystalline carbon. According to another embodiment, the carbon material is a functional carbon material including sulfonated carbon, phenyl sulfonated carbon, carboxylic carbon, hydroxyl carbon, silane treated carbon, or nitrogen substituted carbon.

The proton conducting mechanism of the PEMFC includes a Vehicular mechanism and a Grotthuss mechanism. In the Vehicular mechanism, protons are dissociated from strong acids to form hydronium ions ($H_3O^+$) with water. During the high temperature operation, the proton exchange membrane was easier to lose water, the conductivity of the protons is decreased excessively, and those of them also had the problem of methanol crossover. Therefore, the membranes operated by Vehicular mechanism cannot be suitable in the high temperature, low humidity environment and under high methanol concentration. Accordingly, to improve proton conductivity of the proton exchange membrane under the high temperature operation, it is necessary to maintain the water-retention capacity of the proton exchange membrane. On the other hand, in the Grotthuss mechanism, protons are conducted by hopping between different proton supplying positions on the proton exchange membrane. Specifically, the protons can be conducted to some extent in no need of water. Such proton exchange membrane often has Brönsted acid base pairs (Brönsted acid base ionic liquids) or excessively doped proton acids, so that the higher the temperature (especially above 130° C.), the larger the ion conductivity accordingly. Hence, the Grotthuss mechanism is more applicable to the high temperature PEMFC system than to the low temperature operating system.

Nafion is the most common material of the proton exchange membrane in the PEMFC. The proton exchange membrane made from PFSA or other materials containing sulfonic acid groups is usually adapted to the Vehicular mechanism. Since Nafion can result in high proton conductivity when water content in Nafion is sufficient, the operational temperature of Nafion is 90° C. or below (e.g. 70-80° C.). However, low temperature operation of the PEMFC often induces low catalyst efficiency and difficulty of water management. In particular, Pt catalyst is susceptible to traces of CO poison in the hydrogen fuel during the low temperature operation, such that the catalyst efficiency is reduced. Moreover, ion conductivity is lowered down because the proton-conducting membrane with low current density is prone to dehydration. Therefore, fuel needs to be humidified in most cases. Nonetheless, during the operation with high current density, a problem of cathode flooding is likely to occur. Thereby, oxygen cannot be transported to the catalyst surface, thus causing mass transport limitation.

The phosphoric acid doped PBI is another material suitable for making the proton exchange membrane in the PEMFC. The proton exchange membrane made of the PBI doping with phosphoric acid is most adapted to the Grotthuss mechanism. However, the ion conductivity of the membrane at high temperature (160° C.) is not as favorable as the proton conductivity of Nafion at the temperature of 80° C. As a whole, how to maintain the water-retention capacity, dimensional stability, electrochemical stability, chemical resistance, flexibility, and mechanical strength during the high temperature operation is the issue to be resolved when the proton exchange membrane is employed.

According to the embodiments of the invention, the proton exchange membrane not only includes the organic material (e.g. Nafion or s-PEEK) but also includes the inorganic material. The large surface area of the inorganic material results in satisfactory water absorption. In the embodiments of the invention, the proton exchange membrane including the organic-inorganic hybrid has the organic material (e.g. Nafion or s-PEEK) and the inorganic material, such that the proton exchange membrane can have high water-retention capacity and can rapidly transport protons. Moreover, the proton exchange membrane has favorable structural strength and temperature resistance. Accordingly, the proton exchange membrane of the invention can be applied to both the PEMFC in the high temperature, low humidity environment and the passive DMFC to which methanol vapor with high concentration is supplied.

MANUFACTURE OF PROTON EXCHANGE MEMBRANE

Example 1

Unmodified porous carbon (activate carbon) of 20 parts by weight per 100 parts by weight of the total solid contents is distributed into a Nafion solution (NAF DE2020CS manufactured by DuPont), so as to form an ink. The ink is well stirred and cured for 12 hours. After that, the stirred and cured ink is coated onto glass and then evaporated. The membrane is soaked in $H_2SO_4$(aq) with the concentration of 1N at 80° C. for an hour or more, so as to activate the proton substitution reaction. Next, the membrane is soaked in excess pure water at 80° C. for an hour or more, so as to fully remove the acid and obtain a black soft membrane. Characteristics of the membrane are then measured. Measurement of flexibility and glass transition temperature is shown in Table 1, and the variation of dimensional as changing with temperature is indicated in FIG. 1. Water uptakes and water volume swelling ratios are shown in Table 2, FIG. 2, and FIG. 3. Measurement of conductivity at a variety of relative humidity levels is indicated in Table 3 and FIG. 4.

Example 2 to Example 4

The membrane is formed by the same method as described in Example 1, whereas the unmodified porous carbon (activate carbon) of 10 parts by weight, the unmodified porous carbon (activate carbon) of 5 parts by weight, and the unmodified porous carbon (activate carbon) of 2.5 parts by weight are relatively distributed in Example 2, Example 3, and Example 4.

Example 5 and Example 6

The membrane is formed by the same method as described in Example 1, whereas the unmodified porous carbon is respectively replaced by ECP 600 (carbon black, NSA (net surface area): 1200 $m^2$/g) of 5 parts by weight and CL-08 (carbon black, NSA: 210 $m^2$/g, manufactured by China Synthetic Rubber Corporation) of 5 parts by weight in Example 5 and Example 6.

Example 7

The membrane is formed by the same method as described in Example 1, whereas NAF is replaced by s-PEEK, and the unmodified porous carbon (activate carbon) of 5 parts by weight is distributed in Example 7.

Example 8 and Example 9

Functional carbon (phenyl sulfonated carbon and sulfonated carbon) of 5 parts by weight per 100 parts by weight of the total solid contents is distributed into a Nafion solution (NAF DE2020CS manufactured by DuPont), so as to form an ink. The ink is well stirred and cured for 12 hours. After that, the stirred and cured ink is coated onto glass and then evaporated. The membrane is soaked in $H_2SO_4$(aq) with the concentration of 1N at 80° C. for an hour or more, so as to activate the proton substitution reaction. Next, the membrane is soaked in excess pure water at 80° C. for an hour or more, so as to fully remove the acid and obtain a black soft membrane. Measurement of conductivity at a variety of relative humidity levels is indicated in Table 4.

Comparison Example 1

The membrane is formed by the same method as described in Example 1, while the inorganic material, i.e. the unmodified porous carbon (activate carbon) is not used in Comparison Example 1.

Comparison Example 2

The membrane is formed by the same method as described in Example 1, whereas NAF is replaced by s-PEEK, and the inorganic material, i.e. the unmodified porous carbon (activate carbon) is not used in Comparison Example 2.

TABLE 1

|  | Amount of porous carbon (activate carbon) | Flexibility | Glass Transition Temperature (Tg) |
|---|---|---|---|
| Example 1 | 20 wt % | Flexible | 116 |
| Example 2 | 10 wt % | Flexible | 94 |
| Example 3 | 5 wt % | Flexible | 91 |
| Example 4 | 2.5 wt % | Flexible | 80 |
| Comparison Example 1 | 0 wt % | Flexible | 73 |

TABLE 2

|  | Unmodified Porous Carbon (activate carbon) | Original Size | Water Uptake (%) | Water Volume Swelling Size | Water Volume Swelling Ratio |
|---|---|---|---|---|---|
| Example 1 | 20 wt % | (50 mm × 50 mm × 39 μm) | 688.38 | (54 mm × 55 mm × 55 μm) | 27.4% |
| Example 2 | 10 wt % | (50 mm × 50 mm × 25 μm) | 330.00 | (53 mm × 53 mm × 35 μm) | 32.38% |
| Example 3 | 5 wt % | (50 mm × 50 mm × 29 μm) | 73.22 | (54 mm × 55 mm × 34 μm) | 39.28% |
| Example 4 | 2.5 wt % | (50 mm × 50 mm × 25 μm) | 43.08 | (55 mm × 56 mm × 29 μm) | 42.91% |
| Comparison Example 1 | 0 wt % | (50 mm × 50 mm × 30 μm) | 29.66 | (56 mm × 57 mm × 35 μm) | 48.96% |

TABLE 3

| | Conductivity (S/cm) | | | | | | |
|---|---|---|---|---|---|---|---|
| Humidity | Example 1 | Example 2 | Example 3 | Example 4 | Example 5 | Example 6 | Example 7 |
| 30 RH % | $2.2 \times 10^{-3}$ | $2.3 \times 10^{-3}$ | $5.3 \times 10^{-4}$ | $2.6 \times 10^{-4}$ | $6.1 \times 10^{-3}$ | $3.5 \times 10^{-4}$ | $4.3 \times 10^{-4}$ |
| 50 RH % | $3.8 \times 10^{-3}$ | $5.6 \times 10^{-3}$ | $1.9 \times 10^{-3}$ | $1.3 \times 10^{-3}$ | $8.1 \times 10^{-3}$ | $5.2 \times 10^{-4}$ | $9.3 \times 10^{-4}$ |
| 70 RH % | $7.2 \times 10^{-3}$ | $8.8 \times 10^{-3}$ | $7.1 \times 10^{-3}$ | $3.8 \times 10^{-3}$ | $9.9 \times 10^{-3}$ | $1.5 \times 10^{-3}$ | $3.7 \times 10^{-3}$ |
| 90 RH % | $1.1 \times 10^{-2}$ | $2.0 \times 10^{-2}$ | $1.4 \times 10^{-2}$ | $1.1 \times 10^{-2}$ | $2.2 \times 10^{-2}$ | $4.8 \times 10^{-3}$ | $7.4 \times 10^{-3}$ |
| 95 RH % | $1.3 \times 10^{-2}$ | $2.1 \times 10^{-2}$ | $2.0 \times 10^{-2}$ | $1.5 \times 10^{-2}$ | $2.4 \times 10^{-2}$ | $6.6 \times 10^{-3}$ | $3.1 \times 10^{-2}$ |

TABLE 4

| | Conductivity (S/cm) | |
|---|---|---|
| Humidity | Example 8 | Example 9 |
| 30 RH % | $8 \times 10-4$ | $4.9 \times 10-4$ |
| 50 RH % | $3.4 \times 10-3$ | $1.7 \times 10-3$ |
| 70 RH % | $8.2 \times 10-3$ | $6.4 \times 10-3$ |
| 90 RH % | $1.7 \times 10-2$ | $1.4 \times 10-2$ |
| 95 RH % | $2.8 \times 10-2$ | $1.8 \times 10-2$ |

Table 1 indicates the proton exchange membranes have favorable flexibility when the activate carbon of 2.5-20 parts by weight is applied. Additionally, the glass transition temperatures of the proton exchange membranes increase when the content of the unmodified activate carbon increases, so as to improve mechanical strength of the high temperature fuel cell.

It is shown in FIG. 1 that the glass transition temperatures of the membranes (Tg points) increase when the amount of the unmodified activate carbon increases.

Figure 2:
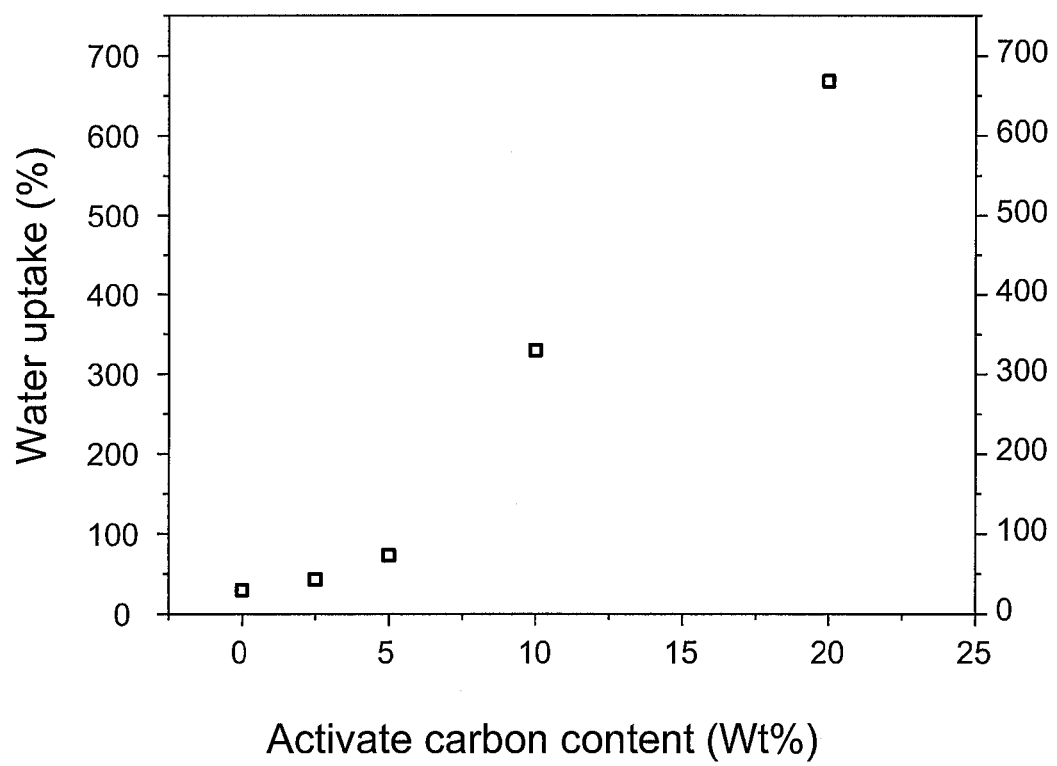
FIG. 2 shows water uptakes of proton exchange membranes containing various contents of activate carbon.
Figure 3:
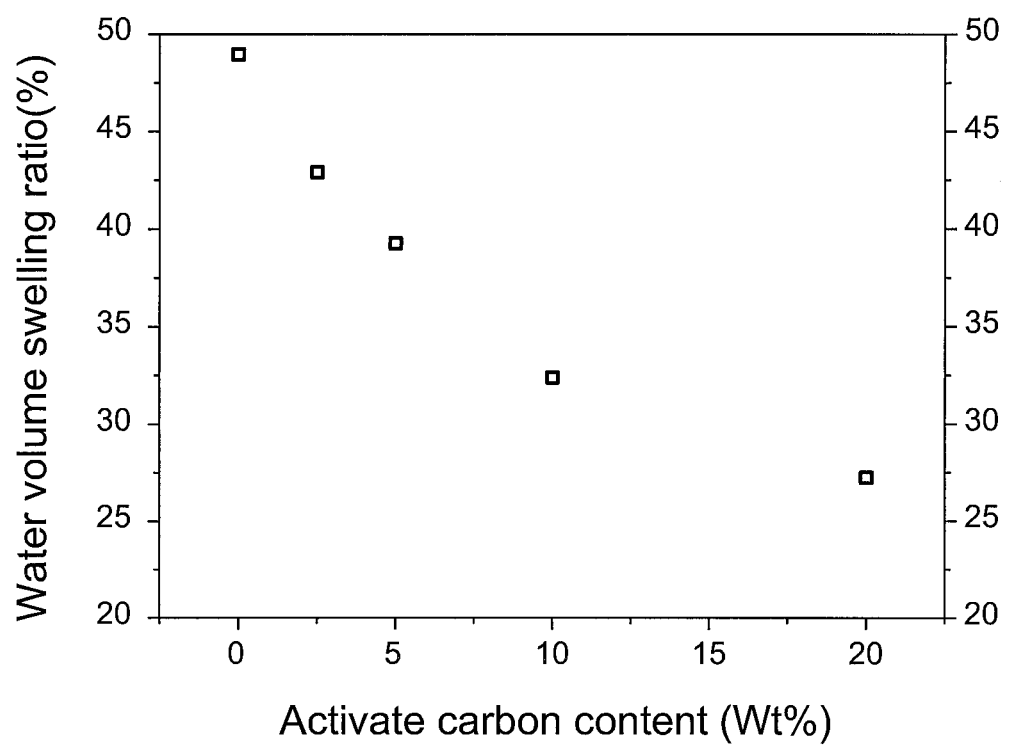
FIG. 3 shows water volume swelling ratios of proton exchange membranes containing various contents of activate carbon.

Table 2 and FIG. 2 show addition of the unmodified activate carbon can improve the water uptake of the exchange membranes which increase together with the increase in the content of the unmodified activate carbon. Thereby, conductivity is improved, and performance of the FC is enhanced. Table 2 and FIG. 3 show addition of the unmodified activate carbon can reduce the water volume swelling ratio which decrease as increasing the content of the unmodified activate carbon, so as to prevent distortion of the FC.

Figure 4:
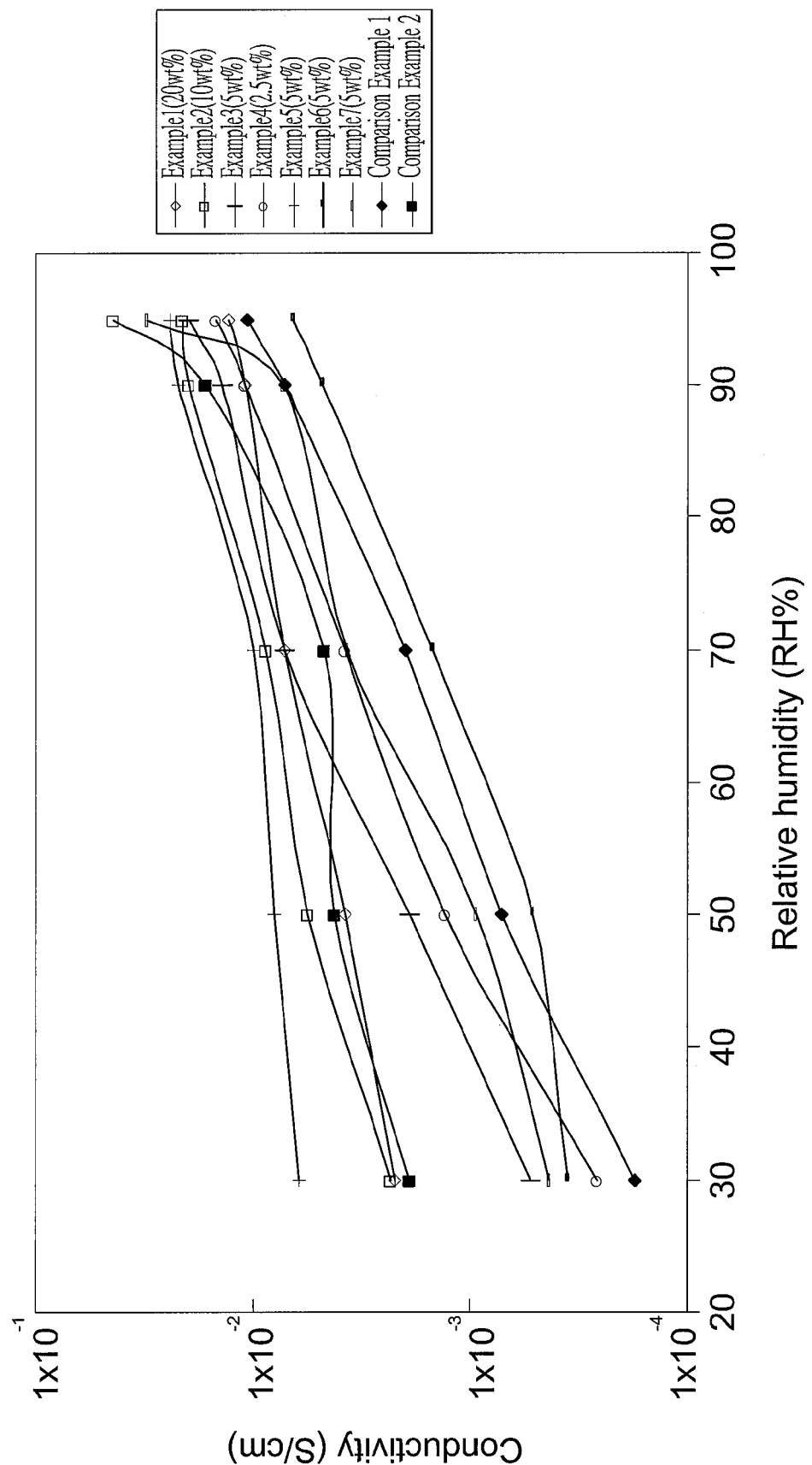
FIG. 4 shows conductivities of proton exchange membranes containing various contents of activate carbon at a variety of relative humidity levels.

Table 3 and FIG. 4 show addition of the unmodified activate carbon can improve the conductivity of the exchange membranes. When the unmodified activate carbon of 10 parts by weight is added, the conductivity attains to the maximum. The lower the relative humidity, the greater the increased range of the conductivity. When the relative humidity is 30 RH %, the conductivity of the exchange membranes to which the activate carbon with the large surface area is added is significantly improved at the temperature of 70-80° C. in comparison with the conductivity of the exchange membranes to which the Nafion is applied.

Table 4 shows addition of the modified activate carbon (functional carbon material) can improve the conductivity of the proton exchange membranes. The conductivity of membrane containing the modified activate carbon is higher than the membrane containing the unmodified activate carbon. The lower the relative humidity, the greater the increased range of the conductivity.

From the experimental results, the proton exchange membrane described in the embodiments of the invention has great water uptake and desirable mechanical strength in comparison with the proton exchange membrane simply made of Nafion. Besides, swelling or distortion of the proton exchange membrane described in the embodiments of the invention is rather unlikely to happen. Namely, performance of the proton exchange membrane can be advanced when the inorganic material with the large surface area and water-absorbing capacity is added. Thereby, the water volume swelling problem can be resolved. Moreover, the porous inorganic material with the large surface area is added to the proton exchange membrane for water retention and maintenance of proton conductivity in a low humidity environment. As such, both the performance of the proton exchange membrane and the conductivity thereof can be significantly enhanced. Specifically, the proton exchange membrane to which the inorganic material with the large surface area is added is rather competitive in comparison with the proton exchange membrane simply made of Nafion because of the significantly improved conductivity at the temperature of 70-80° C. and in a low humidity environment (30 RH %).

With the present invention, humidification will be reduced. This will result in reduction or elimination of humidification equipment and the reduction of elimination of condensing requirements downstream of the stack. System complexity and cost are also substantially decreased. It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An organic/inorganic hybrid composite proton exchange membrane, comprising:
    an inorganic material of about 0.5 to 30 parts by weight per 100 parts by weight of the proton exchange membrane, wherein a surface area of the inorganic material is about 50 to 3000 m²/g, and wherein a material of the inorganic material comprises an unmodified carbon material, wherein the unmodified carbon material is an activate carbon or a mesoporous carbon material; and
    an organic material of about 99.5 to 70 parts by weight per 100 parts by weight of the proton exchange membrane, the organic material comprising a sulfonated polymer or a phosphoric acid doped polymer.

2. The organic/inorganic hybrid composite proton exchange membrane as claimed in claim 1, wherein the sulfonated polymer is selected form the group consisting of perfluorosulfonic acid polymer, sulfonated poly(ether ether ketone), sulfonated polyimides, sulfonated poly(phenylene oxide), sulfonated poly(arylene ether sulfone), and sulfonated poly(4-phenoxybenzoyl-1,4-phenylene).

3. The organic/inorganic hybrid composite proton exchange membrane as claimed in claim 1, wherein the phosphoric acid doped polymer comprises phosphoric acid doped polybenzimidazole.

* * * * *